(12) United States Patent
Onishi et al.

(10) Patent No.: US 7,425,811 B2
(45) Date of Patent: Sep. 16, 2008

(54) NUMERICAL CONTROLLER

(75) Inventors: Yasushi Onishi, Fujiyoshida (JP);
Tetsuo Hishikawa, Yamanashi (JP);
Takashi Idei, Fujiyoshida (JP)

(73) Assignee: Fanuc Ltd, Yamanashi (JP)

(*) Notice: Subject to any disclaimer, the term of this patent is extended or adjusted under 35 U.S.C. 154(b) by 132 days.

(21) Appl. No.: 11/635,546

(22) Filed: Dec. 8, 2006

(65) Prior Publication Data
US 2007/0145931 A1  Jun. 28, 2007

(30) Foreign Application Priority Data
Dec. 22, 2005 (JP) ............... 2005-370821

(51) Int. Cl.
*G05B 19/18* (2006.01)
(52) U.S. Cl. .............. 318/569; 318/570; 318/571; 318/572; 318/568.22
(58) Field of Classification Search ......... 318/569, 318/570, 571, 572, 568.22
See application file for complete search history.

(56) References Cited

U.S. PATENT DOCUMENTS

| | | | |
|---|---|---|---|
| 4,485,338 A * | 11/1984 | Matsuura et al. | 318/569 |
| 4,782,258 A | 11/1988 | Petrosky | |
| 5,069,060 A * | 12/1991 | Ishii | 72/443 |
| 5,079,490 A * | 1/1992 | Kita et al. | 318/569 |
| 5,331,264 A | 7/1994 | Cheng et al. | |
| 5,656,903 A | 8/1997 | Shui et al. | |
| 6,046,566 A * | 4/2000 | Sonoda et al. | 318/625 |

(Continued)

FOREIGN PATENT DOCUMENTS

| | | |
|---|---|---|
| EP | 1 221 765 A1 | 9/2000 |
| JP | 60-3715 | 1/1985 |
| JP | 1-314130 | 12/1989 |
| JP | 1314130 | 12/1989 |
| JP | 10-85866 | 4/1998 |
| JP | 2000-354988 | 12/2000 |
| JP | 2002-202819 | 7/2002 |

OTHER PUBLICATIONS

XP-002425727, Database WPI Week 197808; Derwent Publications Ltd., London, GB; AN 1978-86111A.

(Continued)

*Primary Examiner*—Paul Ip
(74) *Attorney, Agent, or Firm*—Staas & Halsey LLP

(57) ABSTRACT

When a servomotor (control axis) is coasting and rotating in a servo-off state in which no current is applied to the servomotor, this servo-off state is switched over to a servo-on state in which current is applied to the servomotor, and a position control and a speed control are started. An actual speed in servo-on state is obtained in speed obtaining means by a position/speed detector. Position command means obtains a command movement amount using the actual speed as an initial speed. A position deviation amount corresponding to the actual speed is calculated, a command movement amount, a position deviation amount, and a position deviation amount remaining in a position deviation counter in servo-on state with the sign thereof reversed are added to each other as a command amount to the position deviation counter.

11 Claims, 11 Drawing Sheets

U.S. PATENT DOCUMENTS

| | | | |
|---|---|---|---|
| 6,307,340 B1 | 10/2001 | Wagner et al. | |
| 6,339,203 B1 * | 1/2002 | Nakamura et al. | 219/69.2 |
| 6,463,835 B1 * | 10/2002 | Segawa et al. | 82/1.11 |
| 6,850,026 B2 * | 2/2005 | Takemori et al. | 318/685 |
| 7,301,117 B2 * | 11/2007 | Wiedemann et al. | 219/86.51 |
| 7,331,208 B2 * | 2/2008 | Fujibayashi et al. | 72/454 |
| 2003/0191544 A1 | 10/2003 | Faulhammer et al. | |

OTHER PUBLICATIONS

European Search Report in corresponding Patent Application No. 06256179.0-2206 dated Apr. 16, 2007.

Japanese Notice of Reasons for Rejection and partial translation, mailed Oct. 30, 2007 and issued in corresponding Japanese Patent Application No. 2005-370821.

* cited by examiner

NUMERICAL CONTROLLER

BACKGROUND OF THE INVENTION

1. Field of the Invention

The present invention relates to a numerical controller for controlling a position of a servomotor or controlling a position of a control axis which is driven and controlled by the servomotor, and more particularly, to a numerical controller which starts carrying out positional control by applying current to a servomotor (movable portion) when the servomotor is coasting in a state where no current flows to the servomotor.

2. Description of the Related Art

In a numerical controller which drives a control axis of a movable portion of a machine or the like to control a position of the control axis, a position loop control is usually carried out to control a position of the control axis.

There is a known numerical controller in which when the servomotor is driven and controlled by a controller to control a position of control object up to a target position and then control other than position control of the control object is carried out by the controller, the controller sets a target position in a deviation counter which stores a deviation between a command position of the control object and the actual position thereof, holds the target position by the deviation counter (carries out substantial position control), and the controller carries out operation controls other than position control of the control object (see Japanese Patent Application Laid-open No. 1-314130).

There is also known a die-casting machine or a press machine in which a movable mold (control axis) is driven by a servomotor to open and close a mold, wherein, when the mold is to be opened, as a large force is required, application of current to the servomotor which drives the movable mold is stopped so that no current flows in the servomotor (hereinafter this state is called "servo-off state") and a workpiece and the movable mold are pushed out by hydraulic pressure from the side of the stationary mold, and when the mold is opened and the movable mold is coasting, on the other hand, current is applied to the servomotor (hereinafter this state is called "servo-on state"), and a position of the movable mold (control axis) is controlled.

When servo-off state where the servomotor and the movable portion are coasting is changed into servo-on state and position control is started in servo-on state, there is a problem that the speeds of the servomotor and the control axis are once reduced and then sharply increased due to the influence of the position deviation counter (position deviation) used for position control, with the result that they can not move smoothly.

FIG. 12 shows a variation in the speed of a servomotor occurred when position control is started in servo-on state which is switched over from servo-off state where the servomotor (control axis) is coasting. When no current is applied to the servomotor in a servo-off state, position control of the servomotor is not carried out. Therefore, only a position feedback signal from a position detector mounted on the servomotor or the like is input to the position deviation counter which stores a position deviation between a command position and the actual position, and a movement amount by the coasting of the servomotor is stored in the position deviation counter. For example, assuming that, when a servomotor gets into servo-off state, the servomotor is pushed out in the positive direction due to an external force so that the servomotor moves in the positive direction, the position feedback signal serves to subtract the value of the position deviation counter, with the result that negative position deviation is increased.

If the servomotor gets into servo-on state and position control is again started, the servomotor which is coasting in the positive direction is driven in a negative position by the negative position deviation stored in the position deviation counter, and the servomotor is abruptly decelerated or reversely rotated. Then, the servomotor is accelerated by a position command according to the position control. As a result, as shown in FIG. 12, there is a problem that, when position control is started when servo-off state is switched over to servo-on state, abrupt speed change caused by abrupt speed reduction and subsequent speed increase is brought about so that the servomotor cannot move smoothly. Even if the value of the position deviation counter is periodically cleared to "0" by follow up processing, a position deviation remains in the position deviation counter dependent on timing on servo-on state so that the above-described speed variation is caused.

SUMMARY OF THE INVENTION

The present invention relates to a numerical controller in which a position deviation is obtained by a position deviation counter based on a command position and a detected actual position, a position loop control is carried out based on the obtained position deviation, and a servomotor which drives and controls a control axis is controlled.

A first aspect of a numerical controller of the present invention comprises: actual speed obtaining means for obtaining an actual speed of the control axis; position command means for obtaining a command movement amount using, as an initial speed, an actual speed obtained by the actual speed obtaining means when a state in which no current is applied to the servomotor is switched over to a state in which current is applied to the servomotor, and outputting the obtained command movement amount to the position deviation counter; and means for outputting a position deviation amount corresponding to the initial speed to the position deviation counter in a first move command outputting period subsequent to the switchover. According to this aspect, when the servomotor is switched over from servo-off state to servo-on state, control is carried out using the coasting speed of the control axis at that time as an initial speed, speed is not varied and smooth position speed control can be started.

A second aspect of the numerical controller of the present invention comprises: actual speed obtaining means for obtaining an actual speed of the control axis; storing means for storing, every predetermined period, an actual speed obtained by the actual speed obtaining means in a state in which no current is applied to the servomotor; means for predicting, by calculation, an actual speed assumed when a state in which no current is applied to the servomotor is switched over to a state in which current is applied to the servomotor, from one or more actual speed data sets which have been stored previously in the storing means; position command means for obtaining a command movement amount by using the predicted actual speed as an initial speed when a state in which no current is applied to the servomotor is switched over to a state in which current is applied to the servomotor, and outputting the obtained command movement amount to the position deviation counter; and means for outputting a position deviation amount corresponding to the initial speed to the position deviation counter in a first move command outputting period subsequent to the switchover. According to this aspect, the actual speed of the control axis is predicted while taking the delay into account, and control can be carried out based on the predicted actual speed.

In the first and second aspects, the numerical controller may further comprise external signal outputting means which outputs a signal for switching over from a state in which no current is applied to the servomotor to a state in which current is applied to the servomotor. Also, the switchover from a state in which no current is applied to the servomotor to a state in which current is applied to the servomotor may be carried out when an condition which has been set arbitrarily in advance is satisfied.

A third aspect of the numerical controller of the invention comprises: actual speed obtaining means for obtaining an actual speed of the control axis; maximum speed detecting means for detecting that an actual speed obtained by the actual speed obtaining means reaches a speed close to a maximum speed in a state in which no current is applied to the servomotor, and outputs a switchover command for switching the state of the servomotor to a state in which current is applied to the servomotor; position command means for obtaining a command movement amount using, as an initial speed, an actual speed detected by the maximum speed detecting means when a state in which no current is applied to the servomotor is switched over to a state in which current is applied to the servomotor, and outputting the obtained command movement amount to the position deviation counter; and means for outputting a position deviation amount corresponding to the initial speed to the position deviation counter in a first move command outputting period subsequent to the switchover. According to this aspect, current is applied to the servomotor at a speed close to the maximum speed when the control axis is coasting, and control of the position and the speed can be started.

In the third aspect, the numerical controller may further comprise averaging means for averaging actual speeds obtained by the speed obtaining means, wherein the maximum speed detecting means detects that the averaged actual speed reaches a speed close to the maximum speed. Also, the numerical controller may further comprise, instead of the maximum speed detecting means, switching speed detecting means which outputs a switchover command for switching the state of the servomotor to a state in which current is applied to the servomotor if it is detected that the actual speed obtained by the actual speed obtaining means reaches a set speed in a state in which no current is applied to the servomotor.

In the first, second and third aspects, the numerical controller may further comprise means for reversing the sign of a position deviation amount remaining in the position deviation counter when the switchover is carried out, and outputting it to the position deviation counter in a first move command outputting period subsequent to the switchover.

In the position command means in which an actual speed is used as an initial speed, a target speed may be used as an actual speed, and a speed detected when a state in which no current is applied to the servomotor is switched over to a state in which current is applied to the servomotor is held.

The numerical controller may further comprise at least one more servomotor, wherein the respective control axes are driven by the servomotors, and a tandem control in which one movable portion is driven in synchronism is carried out.

When a safety condition is not satisfied, the state of the servomotor need not be switched to state in which current is applied to the servomotor.

According to the present invention which has the above-described structures, abrupt change in speed can be prevented when a state in which no current is applied to the servomotor and a control axis driven and controlled by the servomotor is coasting is switched over to a position/speed controlling state in which current is applied to the servomotor to control a position and a speed of the control axis, thereby allowing such switchover to be carried out with smooth movement.

BRIEF DESCRIPTION OF THE DRAWINGS

The above-described and other objects and features of the present invention will become apparent from the following description of embodiments with reference to the accompanying drawings, in which.

DETAILED DESCRIPTION OF THE PREFERRED EMBODIMENTS

A first embodiment of a numerical controller of the present invention will be explained using FIGS. 1 to 6.

Figure 1:
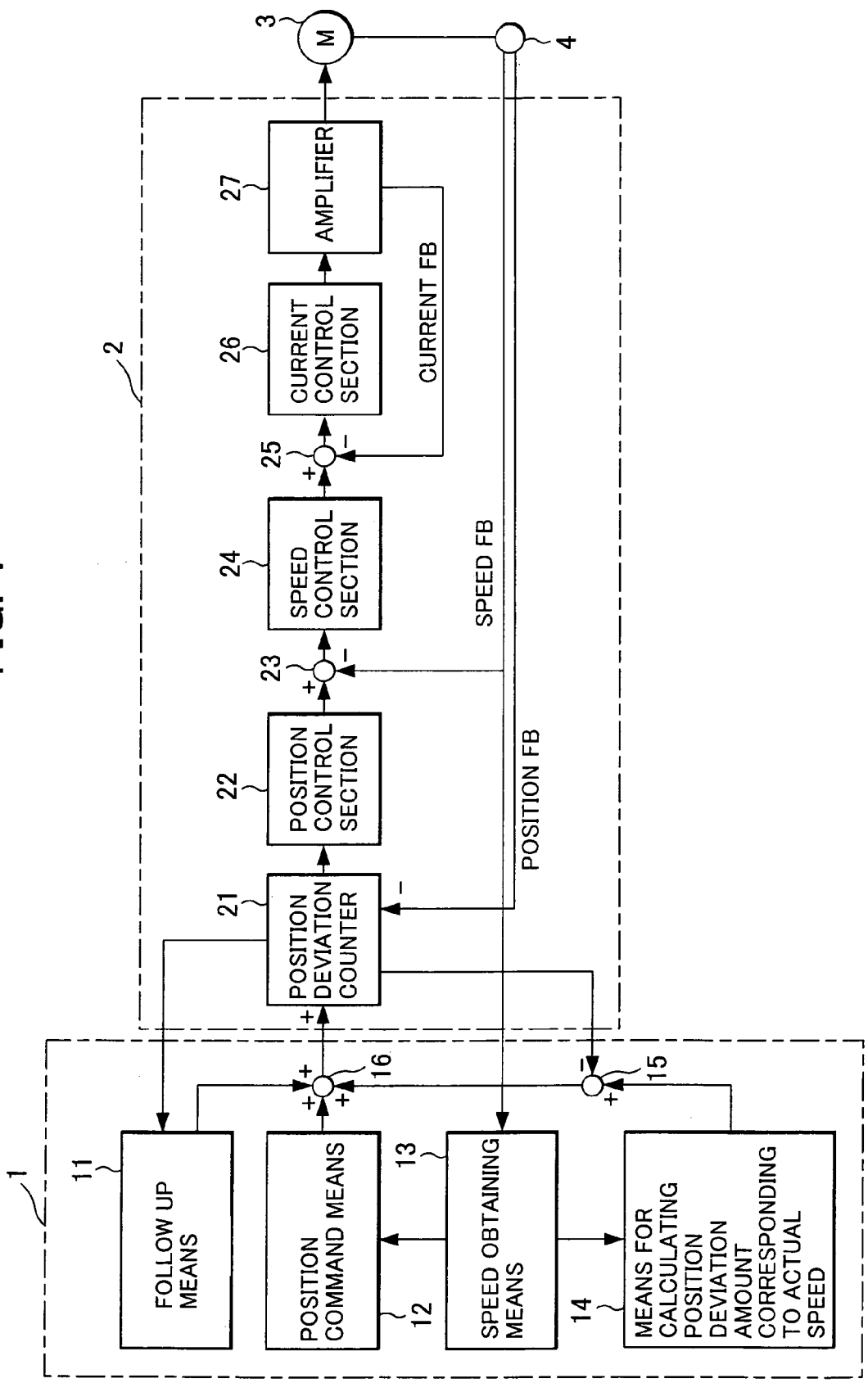
FIG. 1 is a block diagram showing a first embodiment of a numerical controller of the present invention.

The numerical controller shown in FIG. 1 includes a numerical control section 1 and a servo control section 2, like a conventional numerical controller. The servo control section 2 carries out position/speed control of a servomotor 3 based on a move command sent from the numerical control section 1 and further carries out a current loop control to control a position and speed of the servomotor (control axis driven by the servomotor). The numerical controller is different from the conventional numerical controller in that the numerical control section 1 also includes speed obtaining means 13, calculating means 14 which calculates a position deviation amount corresponding to an actual speed, and adder-subtractors 15 and 16, and in that the distribution processing of move command is carried out with an initial speed set to the current actual speed in servo-on state in the position command means 12 which outputs a move command.

When the position control of the servomotor (control axis driven by the servomotor) 3 is to be carried out, like the conventional technique, the position command means 12 carries out the distribution processing of the move command based on the move command instructed by an NC program or the move command instructed by an operator, a distribution command movement amount MCMD for each predetermined distribution period (move command output period) is obtained, and the obtained distribution command movement amount MCMD is output to a position deviation counter 21 of the servo control section 2 through the adder-subtractor 16. In this case, since there is no command from the adder-subtractor 15 and no command from the follow up means 11, the command movement amount MCMD obtained by the position command means 12 is directly added to the position deviation counter 21.

The position deviation counter 21 adds the distribution command movement amount MCMD, subtracts a position feedback amount obtained from the position/speed detector 4, and obtains the position deviation. In the position control section 22, the position deviation is multiplied by a position loop gain to obtain a speed command.

An adder-subtractor 23 subtracts, from the speed command, a speed feedback amount which is fed back from the position/speed detector 4 to obtain a speed deviation. A speed control section 24 carries out speed loop control such as PI control (proportional-plus-integral control) and the like to obtain a torque command (current command). An accelerator/decelerator 25 subtracts, from the torque command, a current feedback amount which is fed back from the current detector provided in an amplifier 27 to obtain a current deviation, and a current control section 26 carries out current loop control and drives and controls the servomotor 3 through the amplifier 27.

The above-described position control operation is the same as the position control operation in conventional numerical controllers.

When a power supply of the servomotor 3 is turned OFF and the servomotor 3 is switched over to servo-off state in which no current is applied to the servomotor 3, the servomotor 3 can freely rotate. Therefore, when the control axis (movable mold in a die-casting machine or press machine) driven by the servomotor 3 is pushed out by external force brought about by hydraulic pressure, the movable portion and the servomotor coast. The numerical control section 1 includes the follow up means 11 for grasping a position of the servomotor 3 (position of the control axis) during the coasting, and when the servomotor is in servo-off state, the follow up means 11 is operated.

As the servomotor 3 coasts, a position feedback signal from the position/speed detector 4 is input to the position deviation counter 21. If the servomotor 3 coasts in a positive direction, for example, a negative value is input to the position deviation counter 21. The follow up means 11 of the numerical control section 1 reads the value of the position deviation counter 21 every predetermined period so that a value of a current position register which stores a current position of the servomotor (movable portion) 3 is renewed by the read value. Further, the follow up means reverses the sign of the read value and outputs the same to the position deviation counter 21 through the adder-subtractor 16 so that the position deviation counter 21 exhibits "0", and sets the value of the position deviation counter 21 to "0". When the servomotor is in servo-off state, neither command from the position command means 12 nor command from the adder-subtractor 15 is output.

When the servomotor is in servo-off state, the follow up means 11 repeatedly executes the operation, and sets the position deviation counter to "0" while renewing the current position of the servomotor.

Releasing servo-off state and switching over from this servo-off state to servo-on state where current is applied to the servomotor 3 by connecting the servomotor 3 to a source of power to apply current to the servomotor 3, position control is started.

In the die-casting machine or press machine whose movable mold (control axis) is driven by a servomotor, the movable mold (control axis) is pushed out from the stationary mold by external force such as hydraulic pressure, and when the mold is opened, the servomotor gets into servo-on state and the position control is started.

When the servomotor gets into servo-on state, the speed obtaining means 13 of the numerical control section 1 obtains the actual speed which is detected and fed back by the position/speed detector 4, and outputs the obtained actual speed to the position command means 12. The position command means 12 obtains and outputs the distribution command movement amount using the actual speed as an initial speed. The calculating means 14 which calculates a position deviation amount corresponding to the actual speed calculates a position deviation amount corresponding to the actual speed obtained by the speed obtaining means 13 only for an initial distribution period in which the servomotor gets into servo-on state. The adder-subtractor 15 reverses the sign of a position deviation amount remaining in the position deviation counter 21 and adds the same to a position deviation amount calculated by the calculating means 14. This sum (output of the adder-subtractor 15) is added to a command movement amount which is output from the position command means 12 by the adder-subtractor 16, and the sum is output to the position deviation counter 21.

The position deviation amount corresponding to the actual speed, which is obtained by the calculating means 14 which calculates a position deviation amount corresponding to the actual speed, is obtained in the following manner:

Since position deviation amount=speed/position loop gain, then $ERR_{vo} = VO$/position loop gain where the actual speed detected by the position/speed detector 4 in servo-on state is defined as VO, and the position deviation amount corresponding to the actual speed in servo-on state is defined as $ERR_{vo}$.

That is, the position deviation amount $ERR_{vo}$ is obtained by the actual speed VO in servo-on state and the position loop gain.

If a command movement amount of the first distribution period in servo-on state, obtained by the position command means 12 using the actual speed as the initial speed, is defined as $MCMD_{vo}$, and a position deviation amount remaining in the position deviation counter 21 in servo-on state is defined as $ERR_{svon}$, a command value which is output to the position deviation counter 21 during the first distribution period in servo-on state is $MCMD_{vo} + ERR_{vo} - ERR_{svon}$.

In the subsequent distribution periods, a distribution command movement amount which is obtained in accordance with a program or a move command instructed by an operator by the position command means 12 using the actual speed as the initial speed is output to the position deviation counter 21.

Figure 2:
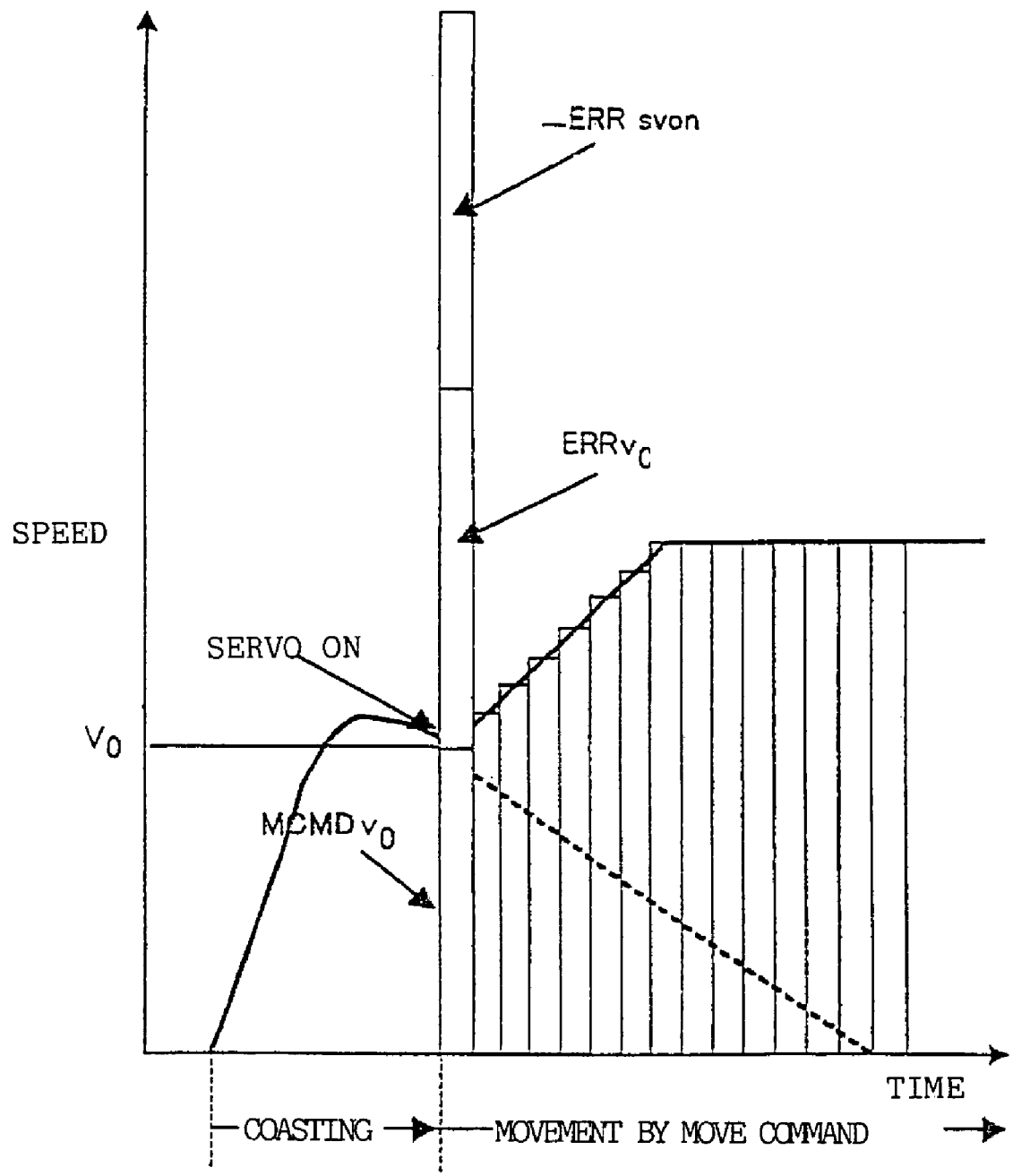
FIG. 2 is a diagram showing a variation in a command movement amount in servo-on state in the numerical controller shown in FIG. 1.

FIG. 2 shows variation of the command movement amount in servo-on state.

If the servomotor gets into servo-on state when the servomotor 3 is coasting in servo-off state, a command value of "MCMDvo+ERRvo−ERRsvon" is output to the position deviation counter 21 in the first distribution period after the servomotor gets into servo-on state as described above. In the distribution periods thereafter, a command movement amount which is subjected to acceleration/deceleration processing using the actual speed obtained by the speed obtaining means 13 as the initial speed is commanded on the basis of a move command instructed in a program or by an operator, which is obtained in the position command means 12.

In the first distribution period in servo-on state, a move command amount of "MCMDvo+ERRvo−ERRsvon" is output. First, "−ERRsvon", obtained by reversing the sign of the position deviation amount ERRsvon which remains in the position deviation counter 21 in servo-on state, is added to the position deviation counter 21. With this, the remaining movement amount remaining in the position deviation counter 21 is cleared. Further, "ERRvo", which shows a movement amount (movement amount corresponding to the actual speed at the time) the servomotor 3 moves until the current move command is output (i.e., during one distribution period), is added to the position deviation counter 21. However, this added value is subtracted by the position feedback amount and, as a result, an amount remaining in the position deviation counter 21 is the command movement amount "MCMDvo" which is obtained in and output by the position command means 12. Consequently, the servomotor 3 is driven by the command movement amount "MCMDvo"=position deviation amount. That is, the drive of the servomotor 3 is started at a speed that the servomotor 3 is coasting in servo-on state. Therefore, as shown in FIG. 2, the speed of the servomotor 3 is not abruptly reduced in servo-on state, with the result that the drive of the servomotor 3 is started smoothly.

Figure 3:
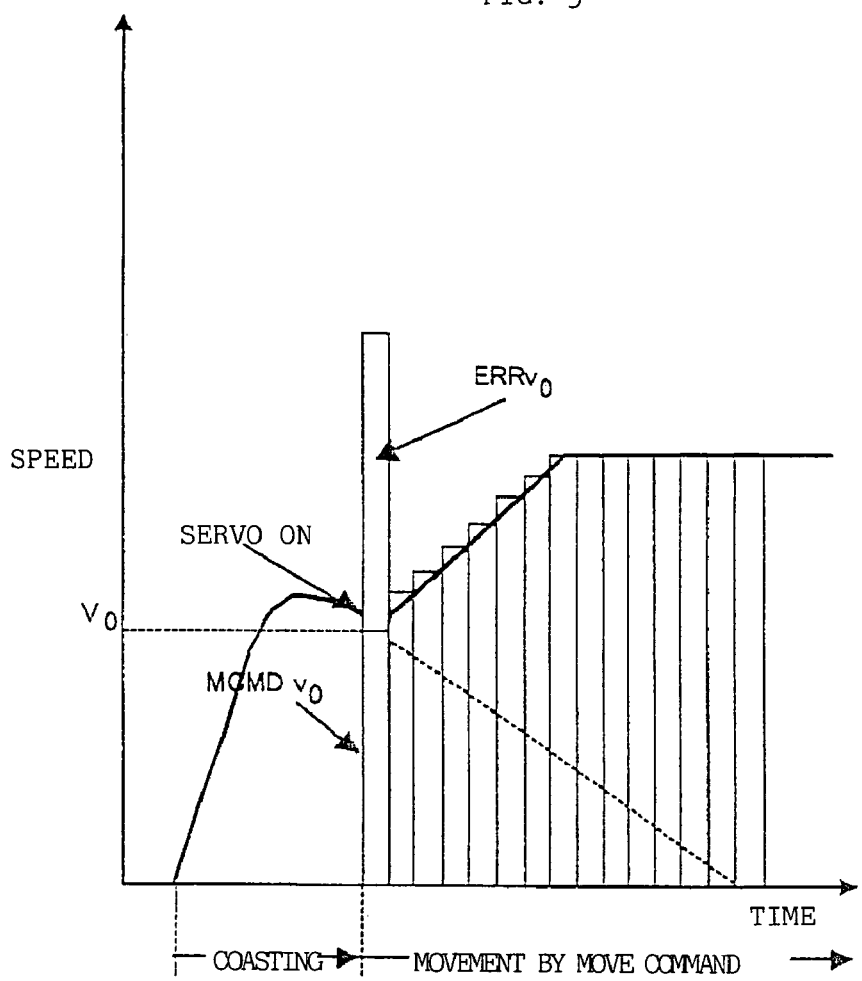
FIG. 3 is a diagram showing variation in the command movement amount when a position deviation amount in servo-on state can be ignored in the numerical controller shown in FIG. 1.

In the embodiment, the position deviation amount ERRsvon remaining in the position deviation counter 21 in servo-on state is added to the position deviation counter 21 with the sign of the ERRsvon reversed, in the first distribution period in servo-on state. In this regard, if servo-on state is brought about at the time when the follow up means 11 sets the position deviation counter 21 to "0", the position deviation amount ERRsvon becomes "0", as a result, the adder-subtractor 15 is unnecessary and it becomes unnecessary to give the position deviation amount ERRsvon in the first distribution period in servo-on state. When the position deviation amount ERRsvon remaining in the position deviation counter 21 in servo-on state is so small that it can be ignored, it is unnecessary to add the position deviation amount ERRsvon with the sign thereof reversed to the position deviation counter 21, the adder-subtractor 15 is unnecessary. FIG. 3 shows a command movement amount (speed of the servomotor) in servo-on state in this case.

Figure 4:
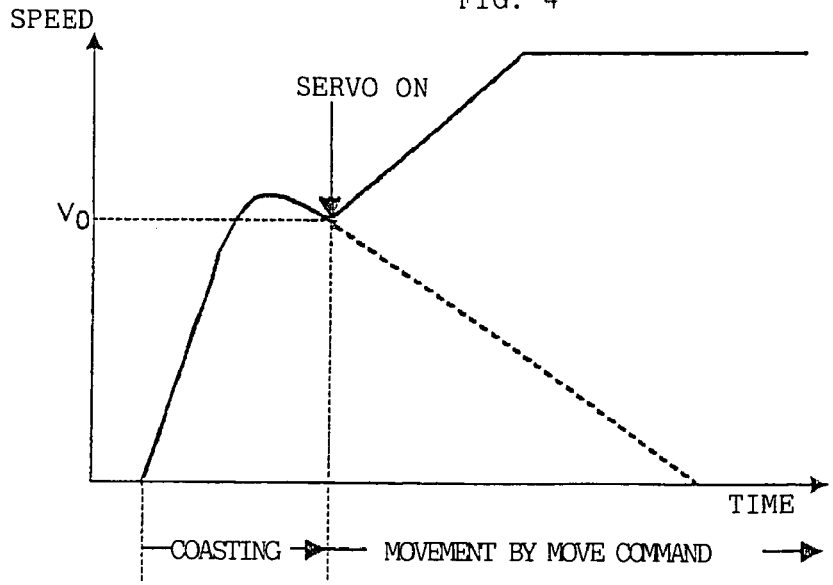
FIG. 4 is a diagram showing speed of a servomotor before and after servo-on state in the numerical controller shown in FIG. 1.

As shown in FIG. 4, the servomotor is driven with the initial speed which is equal to the coasting speed of the servomotor in servo-on state, and after that, the servomotor is accelerated and controlled to a target speed designated by a program or an operator.

Figure 5:
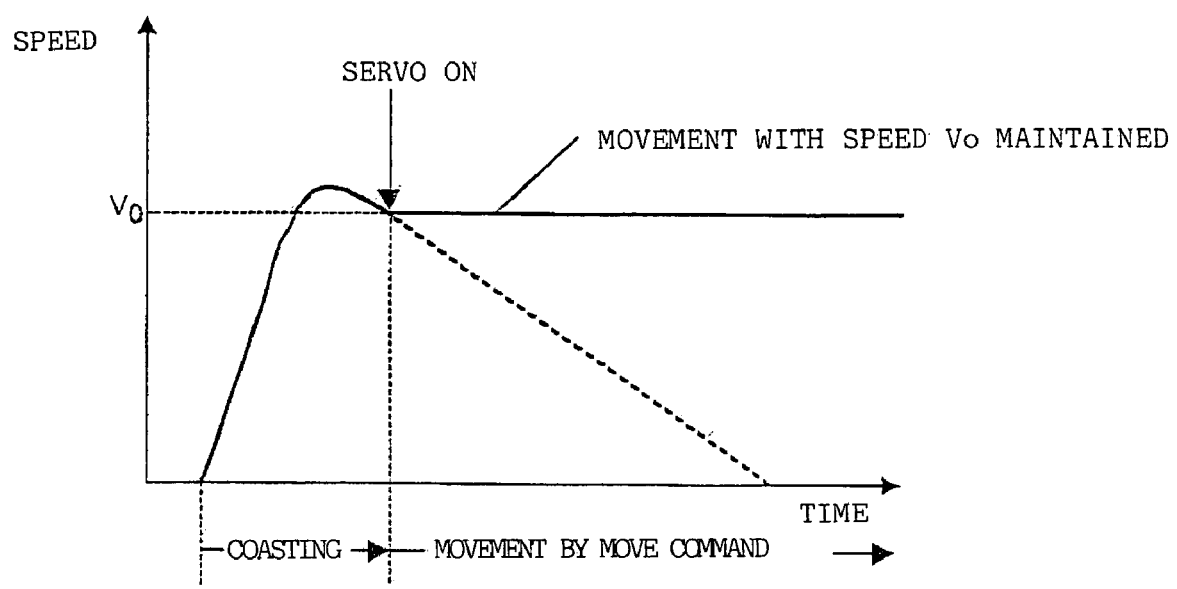
FIG. 5 is a diagram showing speed of the servomotor when the actual speed obtained in servo-on state is set to an initial speed and a target speed in the numerical controller shown in FIG. 1.

Further, if the actual speed obtained in servo-on state is used as initial speed and a target speed, it is possible to carry out control in a manner such the speed after switchover to servo-on state is constant as shown in FIG. 5.

Figure 6:
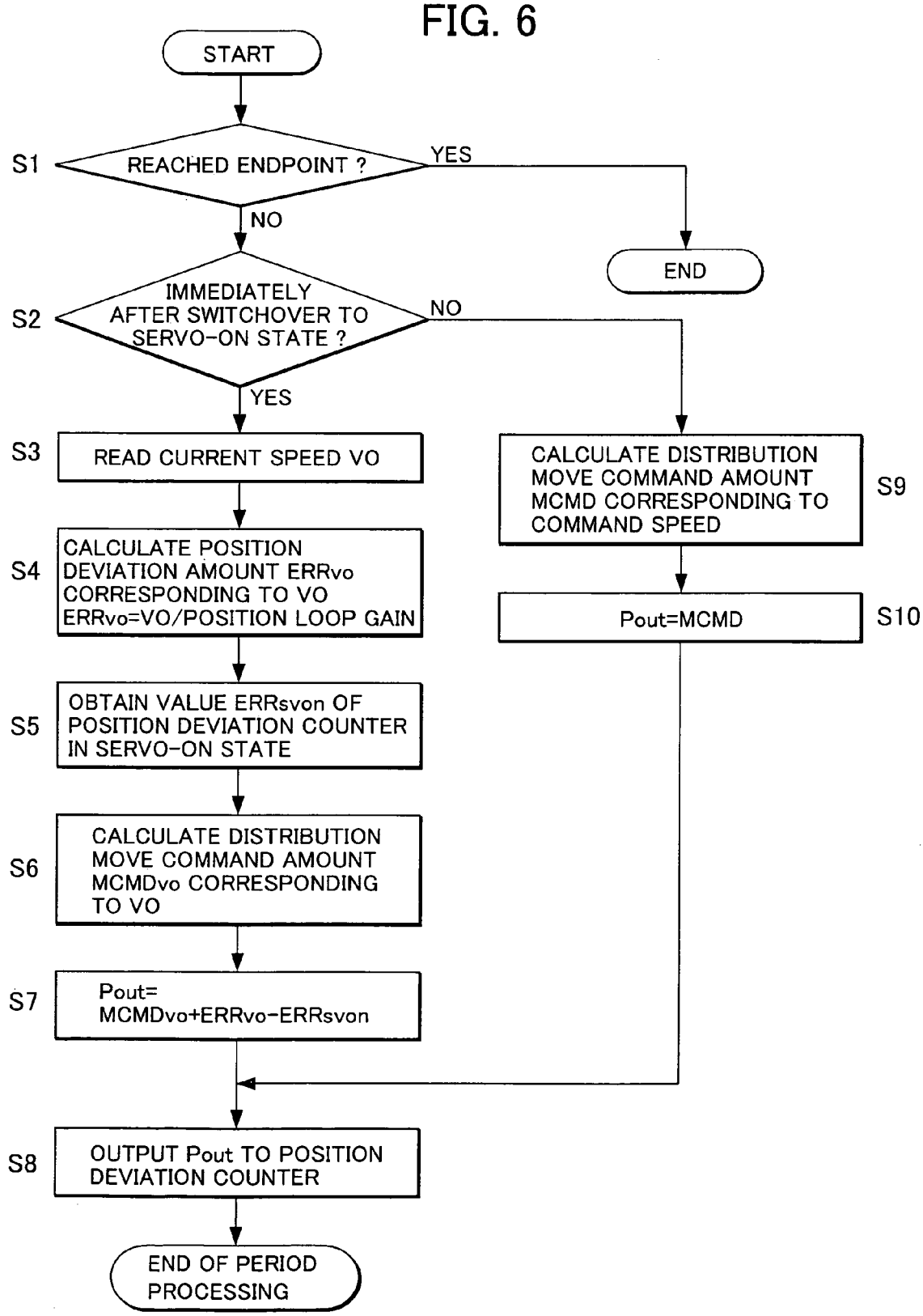
FIG. 6 is a flowchart of processing carried out by a processor of a numerical control section in servo-on state every predetermined distribution period in the numerical controller shown in FIG. 1.

FIG. 6 is a flowchart of processing which is carried out by a processor of the numerical control section 1 every predetermined distribution period when the servomotor gets into servo-on state from servo-off state.

It is determined whether the control axis (servomotor 3) reached an endpoint instructed by the NC program or the operator (step S1), and if the control axis did not reach the endpoint, it is determined whether the current period is the first period in which the servomotor gets into servo-on state (step S2), and if the current period is the first period, the actual speed VO which is output from the position/speed detector 4 is read (step S3), and the position deviation ERRvo corresponding to the read actual speed VO is calculated (step S4).

$ERRvo = VO/\text{position loop gain}$

Next, at this point of time (in servo-on state), a position deviation amount ERRsvon to be stored in the position deviation counter 21 is read (step S5). The actual speed VO which was read in step S3 is used as the initial speed, and distribution move command amount MCMDvo suitable for the actual speed VO is calculated (step S6).

The distribution move command amount MCMDvo obtained in step S6, the position deviation amount ERRvo corresponding to the actual speed VO obtained in step S4, and the position deviation amount ERRsvon obtained in step S5 whose sign is reversed are added to each other, and the command movement amount Pout is obtained (step S7).

$Pout = MCMDvo + ERRvo − ERRsvon$

The obtained command movement amount Pout is output to the position deviation counter 21, and the distribution processing of the move command in the current period is completed.

Since a next period is not a period immediately after switchover to servo-on state, the program proceeds to step S9 from step S2, a distribution command movement amount MCMD is obtained using the actual speed VO in servo-on state as the initial speed on the basis of the command speed instructed by the NC program or the operator. This distribution command movement amount MCMD is set as the command movement amount Pout (step S10), the program proceeds to step S8, the command movement amount Pout is output to the position deviation counter 21, and the distribution processing of the move command of the current period is completed.

The servo control section 2 carries out loop controls of position, speed and current based on the command movement amount which was input to the position deviation counter 21, like the conventional technique, and controls the position and speed of the servomotor (control axis) 3.

Figure 7:
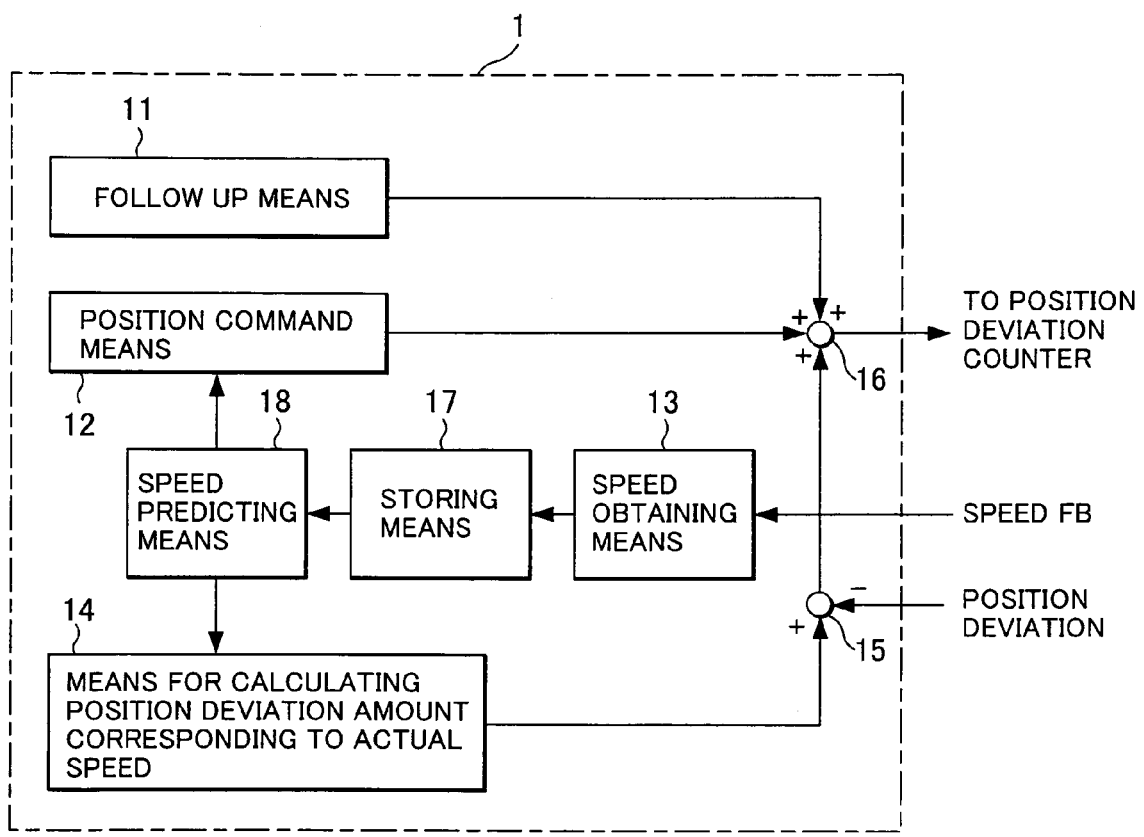
FIG. 7 is a block diagram showing an essential portion of a second embodiment of the numerical controller of the present invention.

A second embodiment of the numerical controller of the present invention will be explained using FIG. 7.

The second embodiment is different from the first embodiment in that storing means 17 for storing actual speed obtained by the speed obtaining means 13, and speed predicting means 18 for predicting the actual speed in the current distribution period from the actual speed stored in the storing means 17 are added. Other portions of the second embodiment are the same as those of the first embodiment.

The actual speed of the control axis (servomotor) is detected by the position/speed detector 4, but since the detection is delayed generally, the obtained actual speed is old information. When the control axis motion is in a steady state and the speed is not varied, there is no problem even if the detected speed is used as the actual speed. However, when the control axis (movable portion) is pushed out by external force in servo-off state, the control axis is in the transient state, the speed is always varied, and the actual speed detected by the position/speed detector 4 may be different from the actual speed in servo-on state and thus, this difference (detection delay) can not be ignored in some cases.

Hence, in the second embodiment, an actual speed assumed when the servomotor actually gets into servo-on state is predicted from an actual speed obtained in the current period and an actual speed obtained in the preceding period, thereby enhancing the precision of the control.

If this prediction is carried out using a primary equation, a predicted actual speed V'O is predicted by calculating the following primary equation from an actual speed in the current period and an actual speed of the preceding period.

$$V'O = (\text{actual speed in current period} - \text{actual speed in preceding period}) + \text{actual speed in current period}.$$

It should be noted that the actual speed may also be predicted using a secondary equation or any other functions.

When an actual speed is to be predicted using the primary equation described above, an actual speed obtained at least in the preceding period is stored in the storing means 17. The speed predicting means 18 carries out calculation of the primary equation based on the actual speed in the preceding period stored in the storing means 17 and the actual speed obtained in the current period, thereby obtaining a predicted actual speed V'O, and this value is output to the position command means 12 and the calculating means 14 which calculates a position deviation amount corresponding to the actual speed. Subsequent processes are the same as those in the first embodiment.

In the second embodiment, when the servomotor is in servo-off state, an actual speed detected by the position/speed detector 4 is read and stored every predetermined period, and when the servomotor is in servo-on state, the processing shown in FIG. 6 is started. In the case of this processing in this embodiment, a predicted actual speed V'O is obtained from the preceding actual speed and current actual speed in step S3, and processing relating to the predicted actual speed V'O is carried out in step S4 and step S6, instead of processing relating to the actual speed VO, which differs only from the processing shown in FIG. 6.

A third embodiment of the numerical controller of the present invention will be explained using FIGS. 8 and 9.

The third embodiment is different from the first embodiment in that the numerical controller of the third embodiment also includes averaging means 19 for averaging an obtained actual speeds, and maximum speed detecting means 20, and in that the maximum speed detecting means 20 outputs a servo-on signal. Other portions of the third embodiment are the same as those of the first embodiment.

In a die-casting machine or a press machine, when a mold is to be opened, a movable mold (control axis) driven by a servomotor and a workpiece are pushed out from a stationary mold by means of a hydraulic pressure apparatus while the servomotor is in a servo-off state, and the servomotor gets into servo-on state in a state where the movable mold is pushed out and is coasting so that position of the movable mold (control axis) is controlled. In that case, it is preferable that the servomotor gets into servo-on state in a state where the movable mold (control axis) reaches a maximum speed by its coasting.

Hence, in the third embodiment, the averaging means 19 such as a filter and the maximum speed detecting means 20 are added to the first embodiment. The third embodiment includes the averaging means 19 which stores actual speed data sets which have been obtained a plurality of past times from the speed obtaining means 13 which obtains actual speed every predetermined period, and calculates the average value thereof. A value (average value) obtained by the averaging means 19 is output to the maximum speed detecting means 20. In the maximum speed detecting means 20, the average actual speed of the preceding period and the average actual speed in the current period are compared with each other, and if the average actual speed in the current period is lower than the average actual speed in the preceding period, it is determined that the maximum speed is detected. That is, it is determined that a speed close to the maximum speed is detected by this processing. The average actual speed at that time is output to the position command means 12 and the calculating means 14 which calculates the position deviation amount corresponding to the actual speed, a servo-on signal is output, the servomotor 3 is connected to the power supply to supply current to the servomotor 3, and the position control of the servomotor 3 is started. Subsequent operations are the same as those of the first embodiment.

In the third embodiment, the averaging means 19 such as a filter is provided. This averaging means 19 is provided for averaging and smoothing the moving speeds because when the control axis (control axis such as a movable mold, which is driven and controlled by the servomotor) is coasting, its speed is not always increased monotonously. It is not always necessary to provide the averaging means 19.

Figure 9:
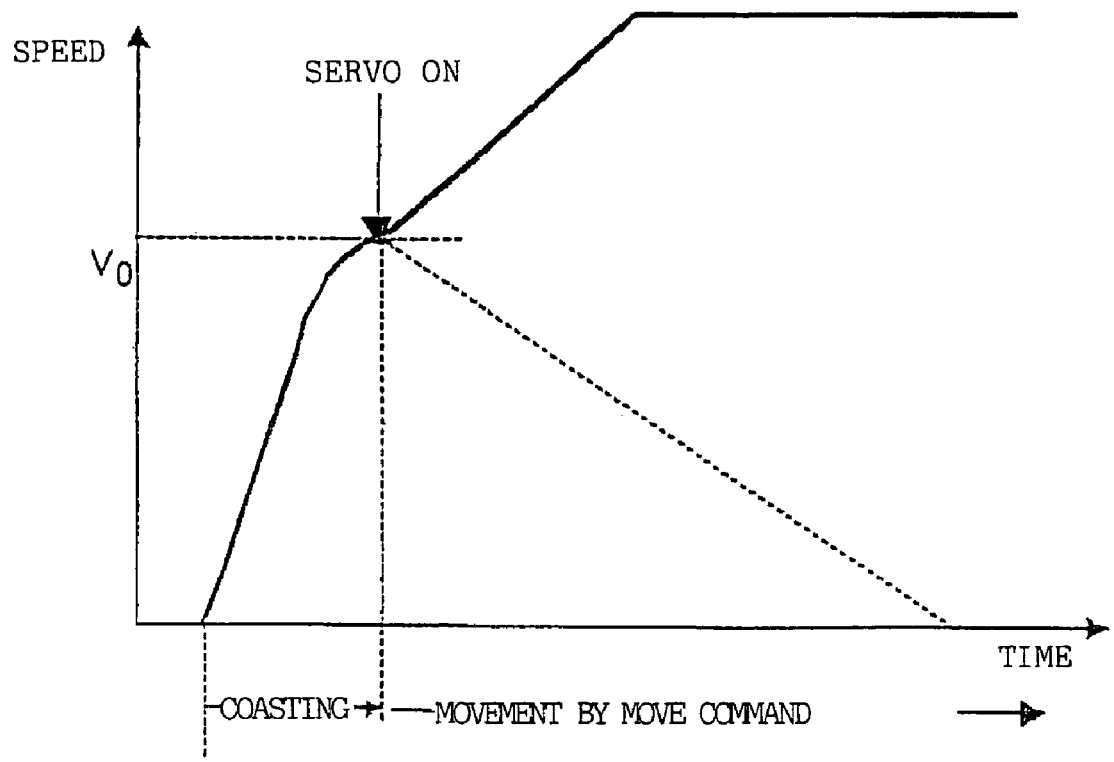
FIG. 9 is a diagram showing speed of the servomotor before and after servo-on state in the numerical controller shown in FIG. 8.

FIG. 9 shows one example showing speed variation of the servomotor (control axis) in the third embodiment. The servomotor gets into servo-on state when the coasting speed of the servomotor reaches near the maximum speed, and then the position control is started to drive the servomotor up to the target speed.

The optimal speed for switching over the servomotor to servo-on state may previously be obtained by an experiment, and switching speed detecting means which detects this speed as a servo-on state switching speed may be provided, instead of the maximum speed detecting means 20. In this case, the switching speed detecting means outputs a servo-on signal when an output of the averaging means 19 or an output of the speed obtaining means 13 becomes equal to or higher than the set servo-on state switching speed, and outputs the speed of that time (average speed which is output from the averaging means 19 or actual speed which is output from the speed obtaining means 13) to the position command means 12 and the calculating means 14 which calculates a position deviation amount corresponding to the actual speed.

Figure 8:
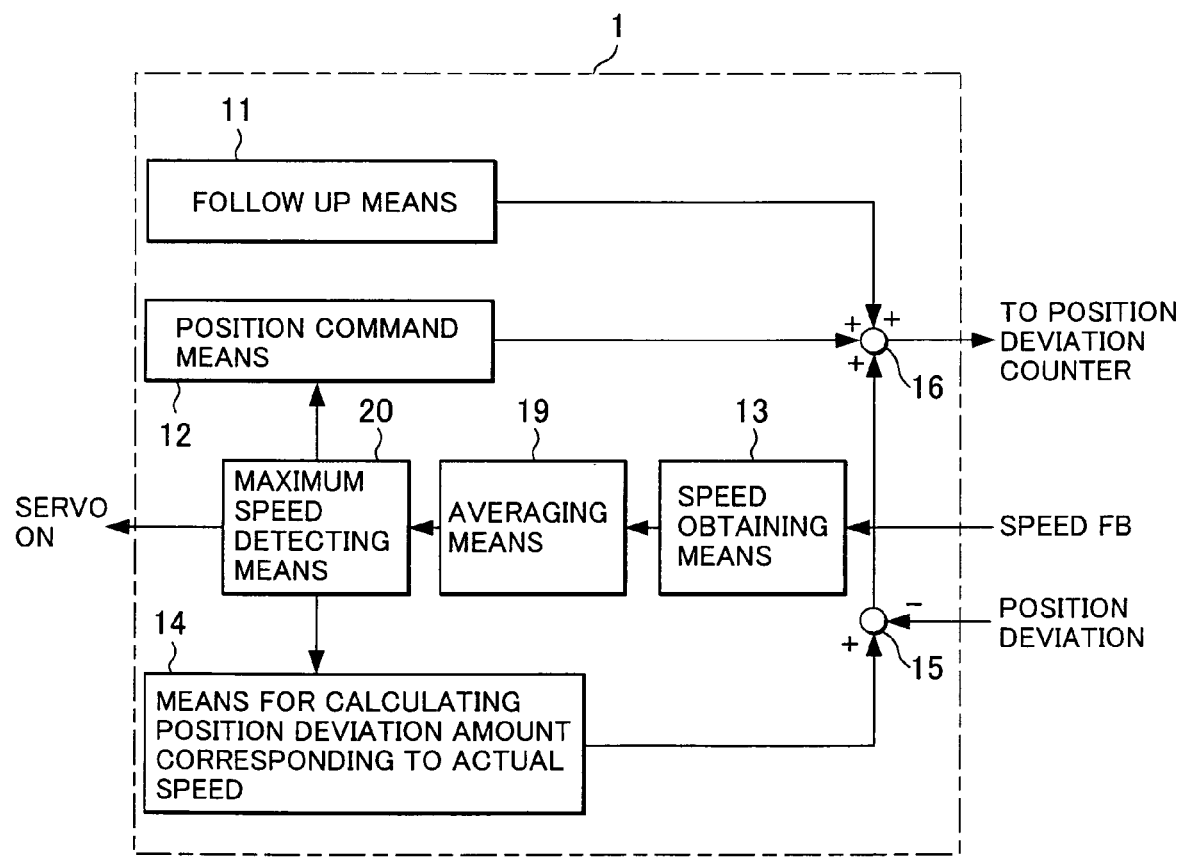
FIG. 8 is a block diagram showing an essential portion of a third embodiment of the numerical controller of the present invention.

In the third embodiment, the processor of the numerical control section 1 executes the processing of the speed obtaining means 13, the averaging means 19 and the maximum speed detecting means 20 in FIG. 8 in servo-off state. More specifically, an actual speed which is fed back from the position/speed detector 4 every predetermined period is read, the average value of the read actual speed and actual speeds read over the plurality of past times is obtained, and it is determined whether the obtained average value is smaller than the average value obtained last time, and if the obtained average value is smaller than the average value obtained last time, it is determined that the maximum speed (value close to the maximum speed) is detected, a servo-on signal is output, and the processing shown in FIG. 6 is executed. This processing is different from the first embodiment only in that the processing related to the current speed VO at step S3 (and steps S4 and S6) shown in FIG. 6 (first embodiment) is replaced with the processing related to a speed which is regarded as the maximum speed.

Explanation concerning the timing at which servo-off state is switched over to servo-on state is not included in the descriptions of the first and second embodiments. In these embodiments, the timing at which servo-off state is switched over to servo-on state can be freely set. More specifically, a position of the control axis (movable portion driven by a servomotor such as a movable mold) may be detected by a limit switch or the like, and the servomotor may get into servo-on state according to a signal of the limit switch or the like. In these embodiments, since a value of the position deviation counter is read by the follow up means and the current position register is renewed and the a current position of the control axis (servomotor) is renewed and stored, the servomotor may get into servo-on state when the current position stored in the current position storing register reaches a set position.

As described above, the timing at which the servomotor gets into servo-on state so that current is applied to the servomotor is set to timing at which the control axis (servomotor) reaches a preset position, timing at which a signal from outside such as a limit switch is received, or timing at which the speed reaches maximum speed or close to the maximum speed as in the case of the third embodiment, but if safety is taken into account, it is safer not to bring the servomotor into servo-on state even these conditions are satisfied in some cases. When safety condition is not satisfied, for example, in case where a safety barrier is opened and a person may enter in the vicinity of a die-casting machine or a press machine which is controlled by the numerical controller, or in case where a door is opened and it will be dangerous if the servomotor gets into servo-on state so that it is driven, the servo-on signal is blocked so as to prevent the servomotor from getting into servo-on state, thereby not allowing current to be applied to the servomotor.

Figure 10:
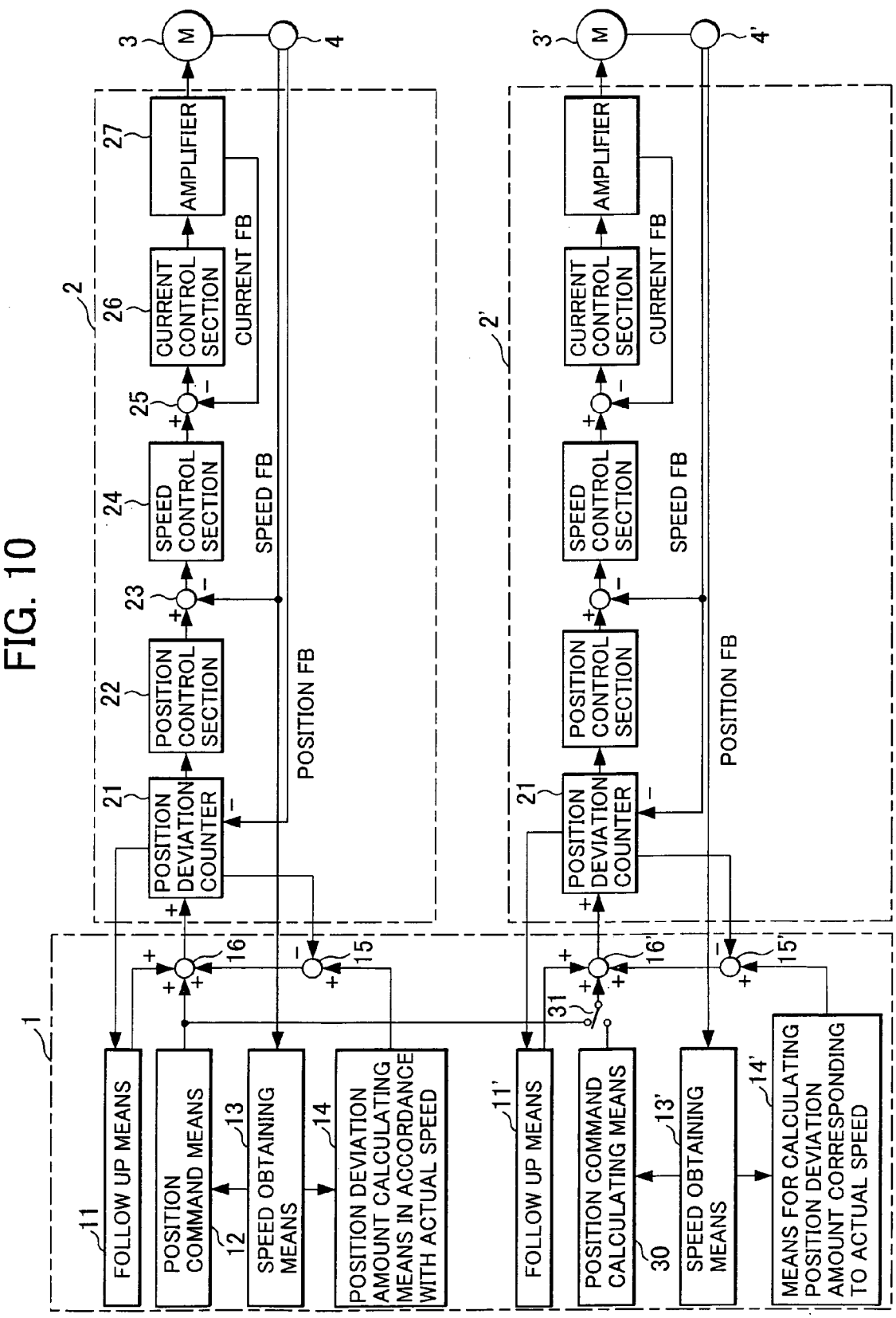
FIG. 10 is a block diagram showing an essential portion of a fourth embodiment of the numerical controller of the present invention.

In each of the embodiments, one movable portion is driven by one servomotor. However, in case where such a movable portion is comparatively large, tandem control for driving and controlling the large movable portion by means of two or more servomotors is employed. The present invention can also be applied to such tandem control. Thus, a fourth embodiment for the tandem control will be explained using FIGS. 10 and 11.

In this embodiment, the movable portion is driven and controlled by two servomotors, i.e., a first servomotor 3 and a second servomotor 3'. The numerical control section 1 includes a servo control system which drives and controls the first servomotor 3, and a servo control system which drives and controls the second servomotor 3'. Both the servo control systems are the same except that the position command means 12 in the servo control system which drives and controls the first servomotor 3 is replaced with a switch 31 and position command calculating means 30 which calculates the command movement amount suitable for an actual speed of the servo control system which drives and controls the second servomotor 3'.

The first and second servomotors 3 and 3' which drive the one movable portion are driven in synchronism with each other. Therefore, normally, the same move commands are output to the servo control systems 2 and 2' of the first and second servomotors 3 and 3'. However, in the first distribution period, after the servomotor gets into servo-on state from servo-off state, move commands based on speeds of the first and second servomotors 3 and 3' and values of the position deviation counters 21 and 21' are output to the servo control systems 2 and 2'. For this reason, the position command calculating means 30 and the switch 31 are provided.

When the servomotor is in servo-on state and normal operation control is carried out, the switch 31 is connected to the position command means 12, the same command movement amounts are output to the servo control systems 2 and 2' every distribution period, and the first and second servomotors 3 and 3' are driven in synchronism with each other.

If the servomotor gets into servo-off state, the first and second servomotors 3 and 3' respectively coast. When the servomotor is in the servo-off state, the respective position deviation counters 21 and 21' are cleared to "0" by the follow up means 11 and 11'.

Next, when the servomotor gets into servo-on state, the first servo control system 2 is subjected to the same processing as that of the first embodiment, and in the first distribution period after the servomotor gets into servo-on state, a command of "MCMDvo+ERRvo−ERRsvon" is input to the position deviation counter 21, as described above. Thereafter, a movement amount for each distribution period obtained by the position command means is input.

In the first distribution period in servo-on state, the switch 31 is connected to the position command calculating means 30. The position command calculating means 30 obtains the command movement amount MCMDvo' in the first distribution period based on the actual speed of the second servomotor 3' obtained by the speed obtaining means 13'. A command "MCMDvo'+ERRvo'−ERRsvon'", obtained by adding a command movement amount MCMDvo' which is output from the position command calculating means 30, a position deviation amount ERRvo' corresponding to an actual speed of the second servomotor 3' obtained by the position deviation amount calculating means 14', and a value −ERRsvon' which is obtained by reversing the sign of a position deviation amount remaining in the position deviation counter 21' to each other, is output to the position deviation counter 21'. From the following distribution period, the switch 31 is connected to the position command means 12, and a movement amount which is output from the position command means 12 is input to the position deviation counter 21'.

Figure 11:
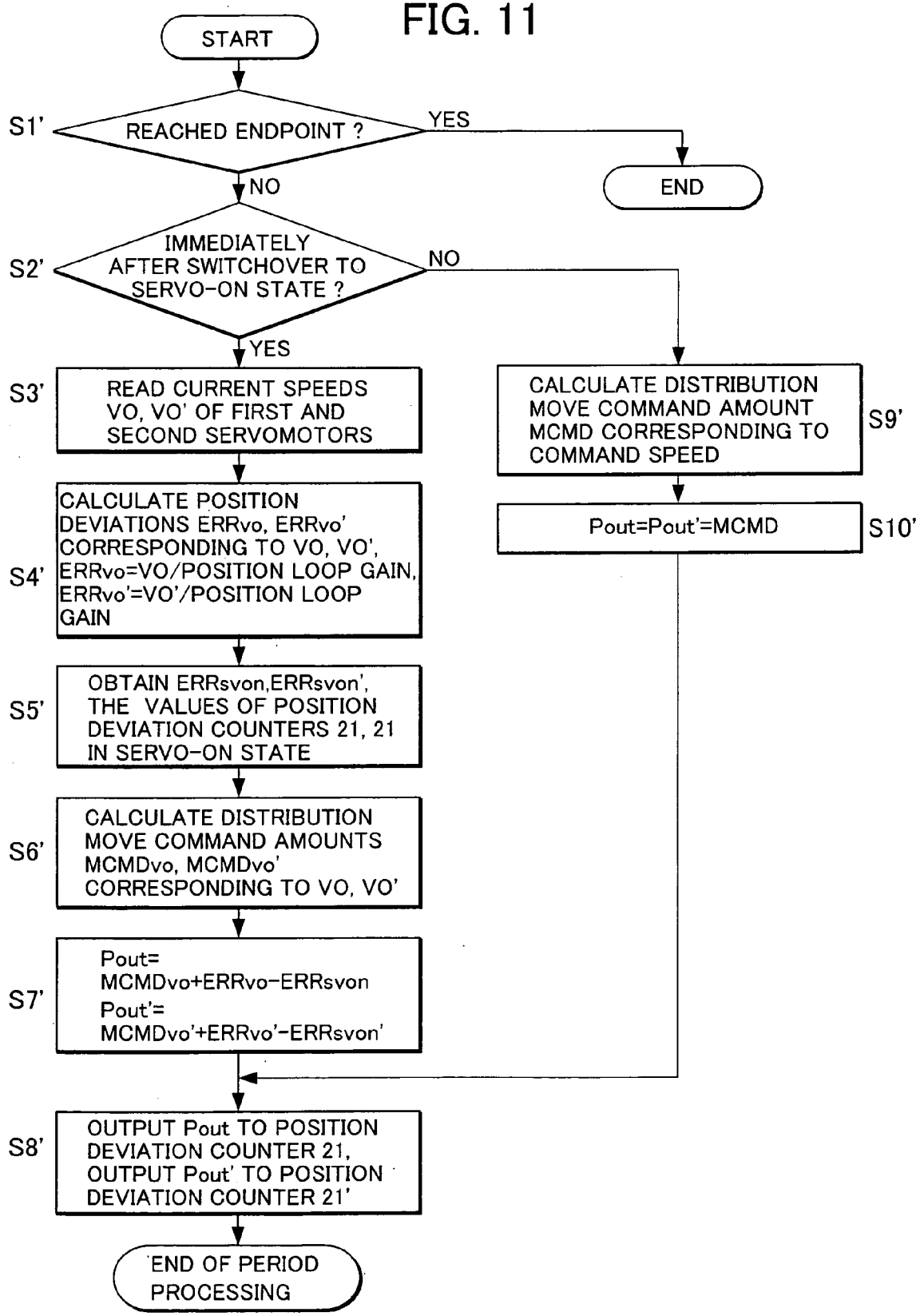
FIG. 11 is a flowchart of processing carried out by a processor of a numerical control section in servo-on state every predetermined distribution period in the numerical controller shown in FIG. 1.
Figure 12:
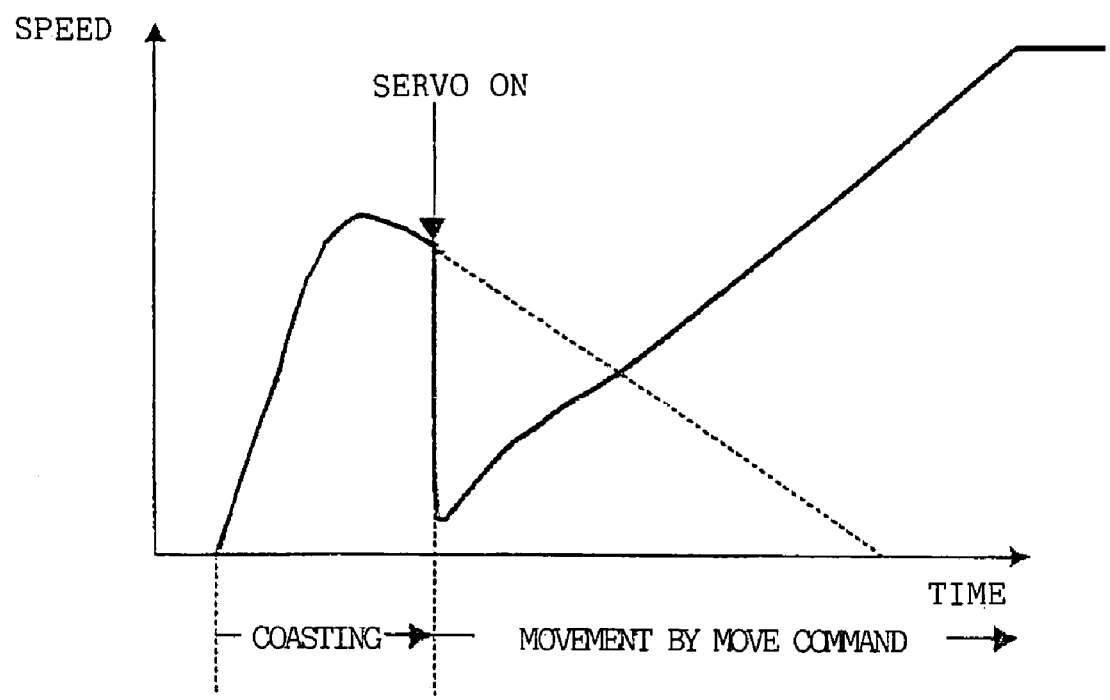
FIG. 12 is a diagram showing variation in speed of the servomotor when the position control is started at a time when servo-off state is switched over to servo-on state, in prior art.

FIG. 11 is a flowchart of processing which is carried out every predetermined distribution period by a processor of the numerical control section 1 when the servomotor gets into servo-on state from servo-off state in the fourth embodiment.

This processing is the same as that of the first embodiment (steps S1' to S10' correspond to steps S1 to S10), and the fourth embodiment is different from the first embodiment in that a move command on the second servomotor 3' is also output. That is, the fourth embodiment is different from the first embodiment only in that the actual speed VO' of the second servomotor 3 is obtained (step 3), a position deviation ERRvo' for the second servomotor 3 (step S4) and a value ERRsvon' of the position deviation counter 21' for the second servomotor 3' in servo-on state are read (step S5), a distribution movement amount MCMDvo' corresponding to the actual speed VO' of the second servomotor 3' is calculated (step S6), a command movement amount Pout' for the second servomotor 3' is obtained and output (steps S7 and S8), and an obtained distribution command movement amount MCMD is used as command movement amounts Pout and Pout' for the first and second servomotors 3 and 3' from a period after a period when the servomotor gets into servo-on state. Therefore, detailed explanation of the processing will be omitted here.

In case where one movable portion is driven by a plurality of servomotors in synchronism, these servomotors will coast substantially in synchronism even if they get into servo-off state, since each of these servomotors is connected to one another through the movable portion. Therefore, in the fourth embodiment, an output of the position command means 12 may directly be input to the adder-subtractor 16' with the position command calculating means 30 and the switch 31 omitted. In this case, a command movement amount corresponding to an actual speed of the first servomotor 3 is output to the second servomotor 3', but since there is no large difference between actual speeds of the first and second servomotors 3 and 3', the speed of the second servomotor 3' is not abruptly varied in servo-on state. In this case, in the processing shown in FIG. 11, a distribution move command amount MCMDvo' for the second servomotor 3 is not obtained in step S6', and the command movement amount Pout' is obtained using a distribution move command amount MCMDvo for the first servomotor 3, instead of the distribution move command amount MCMDvo', in step S7'.

The method of predicting a speed explained in the second and third embodiments, and the method of bringing the servomotor into servo-on state at about the maximum speed can also be applied to the tandem control in the fourth embodiment. If the method of detecting a speed close to the maximum speed and bringing the servomotor into servo-on state as shown in the third embodiment is applied, a speed close to the maximum speed of one of the servomotors which drive the same movable portion in synchronism is detected, and a move command value on each servomotor is obtained based on the speed detected at that time. That is, the maximum speed detecting means 20 shown in FIG. 8 may be provided for only one servomotor.

In the case of tandem control, a position/speed detector which detects a position and a speed of a movable portion driven by each of a plurality of servomotors may be provided on any one of the servomotors or any one of movable portions, instead of providing the position/speed detector on every servomotor or movable portion. In this case, each servomotor is subjected to feedback control on the basis of a position and a speed which are fed back from the one position/speed detector. More specifically, an output of the adder-subtractor 16 in FIG. 1 is output to the respective servo control systems. In the case of torque tandem control, the processing of position and speed feedback is common, and a torque command value is output to a current control section of each servomotor. Therefore, in FIG. 1, a torque command obtained by the speed control section 24 is also output to current control sections of respective servomotors which drive the same movable portion.

In a die-casting machine or a press machine which drives a movable mold using a servomotor and which opens and closes a mold, the present invention can be applied to an apparatus in which when the mold is opened, the servomotor gets into servo-off state, the movable mold is pushed out by an external force of a hydraulic pressure mechanism from a stationary mold to cause the mold open, and then, while a movable mold is coasting by the pushing out action, the servomotor gets into servo-on state so that current is applied to the servomotor, and a position and a speed of the movable mold is controlled. In addition to this, the present invention can also be applied to a case in which a control axis which is coasting in a servo-off state is driven by bringing the servomotor into servo-on state to apply current to the servomotor, and then a position and a speed of the control axis is controlled.

The invention claimed is:

1. A numerical controller in which a position deviation is obtained by a position deviation counter based on a command position and a detected actual position, a position loop control is carried out based on the obtained position deviation, and a servomotor which drives and controls a control axis is controlled, the numerical controller comprising actual speed obtaining means for obtaining an actual speed of said control axis, position command means for obtaining a command movement amount using, as an initial speed, an actual speed obtained by said actual speed obtaining means when a state in which no current is applied to the servomotor is switched over to a state in which current is applied to the servomotor, and outputting the obtained command movement amount to said position deviation counter, and means for outputting a position deviation amount corresponding to said initial speed to said position deviation counter in a first move command outputting period subsequent to said switchover.

2. A numerical controller in which a position deviation is obtained by a position deviation counter based on a command position and a detected actual position, a position loop control is carried out based on the obtained position deviation, and a servomotor which drives and controls a control axis is controlled, the numerical controller comprising actual speed obtaining means for obtaining an actual speed of said control axis, storing means for storing, every predetermined period, an actual speed obtained by said actual speed obtaining means in a state in which no current is applied to the servomotor, means for predicting, by calculation, an actual speed assumed when a state in which no current is applied to the servomotor is switched over to a state in which current is applied to the servomotor, from one or more actual speed data sets which have been stored previously in said storing means, position command means for obtaining a command movement amount by using said predicted actual speed as an initial speed when a state in which no current is applied to the servomotor is switched over to a state in which current is applied to the servomotor, and outputting the obtained command movement amount to said position deviation counter, and means for outputting a position deviation amount corresponding to said initial speed to said position deviation counter in a first move command outputting period subsequent to said switchover.

3. The numerical controller according to claim 1 or 2, further comprising external signal outputting means which outputs a signal for switching over from a state in which no current is applied to the servomotor to a state in which current is applied to the servomotor.

4. The numerical controller according to claim 1 or 2, wherein said switchover from a state in which no current is applied to the servomotor to a state in which current is applied to the servomotor is carried out when an condition which has been set arbitrarily in advance is satisfied.

5. A numerical controller in which a position deviation is obtained by a position deviation counter based on a command position and a detected actual position, a position loop control is carried out based on the obtained position deviation, and a servomotor which drives and controls a control axis is controlled, the numerical controller comprising actual speed obtaining means for obtaining an actual speed of the control axis, maximum speed detecting means for detecting that an actual speed obtained by said actual speed obtaining means reaches a speed close to a maximum speed in a state in which no current is applied to the servomotor, and outputs a switchover command for switching the state of the servomotor to a state in which current is applied to the servomotor, position command means for obtaining a command movement amount using, as an initial speed, an actual speed detected by said maximum speed detecting means when a state in which no current is applied to the servomotor is switched over to a state in which current is applied to the servomotor, and outputting the obtained command movement amount to said position deviation counter, and means for outputting a position deviation amount corresponding to said initial speed to said position deviation counter in a first move command outputting period subsequent to said switchover.

6. The numerical controller according to claim 5, further comprising averaging means for averaging actual speeds obtained by said speed obtaining means, wherein the maximum speed detecting means detects that the averaged actual speed reaches a speed close to the maximum speed.

7. The numerical controller according to claim 5 or 6, further comprising, instead of said maximum speed detecting means, switching speed detecting means which outputs a switchover command for switching the state of the servomotor to a state in which current is applied to the servomotor if it is detected that the actual speed obtained by said actual speed obtaining means reaches a set speed in a state in which no current is applied to the servomotor.

8. The numerical controller according to claim any one of claims 1, 2 and 5, further comprising means for reversing the sign of a position deviation amount remaining in the position deviation counter when said switchover is carried out, and outputting it to said position deviation counter in a first move command outputting period subsequent to said switchover.

9. The numerical controller according to claim any one of claims 1, 2 and 5, wherein in said position command means in which an actual speed is used as an initial speed, a target speed is used as an actual speed, and a speed assumed when a state in which no current is applied to the servomotor is switched over to a state in which current is applied to the servomotor is held.

10. The numerical controller according to claim any one of claims 1, 2 and 5, further comprising at least one more servomotor, wherein the respective control axes are driven by the servomotors, and a tandem control in which one movable portion is driven in synchronism is carried out.

11. The numerical controller according to claim any one of claims 1, 2 and 5, wherein when a safety condition is not satisfied, the state of the servomotor is not switched to state in which current is applied to the servomotor.

* * * * *

UNITED STATES PATENT AND TRADEMARK OFFICE
CERTIFICATE OF CORRECTION

PATENT NO.       : 7,425,811 B2
APPLICATION NO.  : 11/635546
DATED            : September 16, 2008
INVENTOR(S)      : Yasushi Onishi et al.

It is certified that error appears in the above-identified patent and that said Letters Patent is hereby corrected as shown below:

First Page, Column 2 (Foreign Patent Documents), Line 3, below "60-3715" delete "JP    1-314130    12/1989" (Repeated entry).

Sheet 2 of 11 (FIG. 2), Line 2, change "ERR$v_C$" to --ERR$v_O$--.

Signed and Sealed this

Ninth Day of December, 2008

JON W. DUDAS
*Director of the United States Patent and Trademark Office*